(12) United States Patent
Phillips et al.

(10) Patent No.: US 12,241,560 B2
(45) Date of Patent: Mar. 4, 2025

(54) PLUMBING DEVICE

(71) Applicants: RELIANCE WORLDWIDE CORPORATION (UK) LIMITED, West Drayton (GB); RELIANCE WORLDWIDE CORPORATION (AUST.) PTY. LTD., Brisbane (AU)

(72) Inventors: Blake Anton Phillips, Brisbane (AU); Daniel Watson, West Drayton (GB); Andrew Johnson, West Drayton (GB)

(73) Assignees: RELIANCE WORLDWIDE CORPORATION (UK) LIMITED (GB); RELIANCE WORLDWIDE CORPORATION (AUST.) PTY. LTD. (AU)

( * ) Notice: Subject to any disclaimer, the term of this patent is extended or adjusted under 35 U.S.C. 154(b) by 63 days.

(21) Appl. No.: 18/251,557

(22) PCT Filed: Nov. 4, 2021

(86) PCT No.: PCT/EP2021/080611
§ 371 (c)(1),
(2) Date: May 3, 2023

(87) PCT Pub. No.: WO2022/096559
PCT Pub. Date: May 12, 2022

(65) Prior Publication Data
US 2024/0102568 A1 Mar. 28, 2024

(30) Foreign Application Priority Data
Nov. 5, 2020 (AU) ................................ 2020904030

(51) Int. Cl.
*F16K 17/34* (2006.01)
*F16K 17/168* (2006.01)

(52) U.S. Cl.
CPC ............ *F16K 17/34* (2013.01); *F16K 17/168* (2013.01)

(58) Field of Classification Search
CPC ........ F16K 17/34; F16K 17/168; F16K 31/60; F16K 27/067; F16K 5/06; F16K 5/0605;
(Continued)

(56) References Cited

U.S. PATENT DOCUMENTS

| 2012/0193563 A1* | 8/2012 | Croci ................. F16K 15/1848 251/231 |
| 2016/0138738 A1* | 5/2016 | Crompton ............ F16L 13/143 137/15.01 |

(Continued)

FOREIGN PATENT DOCUMENTS

| EP | 1681520 A2 | 7/2006 |
| EP | 3404299 A1 | 11/2018 |

(Continued)

OTHER PUBLICATIONS

Search Report and Written Opinion; International Patent Application No. PCT/EP2021/080611; Mar. 2, 2022.

*Primary Examiner* — Kelsey E Cary
(74) *Attorney, Agent, or Firm* — Barnes & Thornburg LLP (57) ABSTRACT

A plumbing device including a body with at least one inlet and at least one outlet and a number of fluid control mechanisms, wherein each fluid control mechanism performs a different fluid control function compared to the other fluid control mechanisms and wherein the body houses the fluid control mechanisms.

21 Claims, 9 Drawing Sheets

(58) Field of Classification Search
CPC .............. F16K 5/0626; F16K 2200/20; F16K 2200/201; F16K 2201/204; F16L 27/067
See application file for complete search history.

(56) References Cited

U.S. PATENT DOCUMENTS

| | | | |
|---|---|---|---|
| 2018/0335161 A1* | 11/2018 | Ansell ................... | F16K 5/0605 |
| 2019/0078695 A1* | 3/2019 | Tanghetti .............. | F16L 37/088 |
| 2020/0141502 A1* | 5/2020 | Kondo .................. | F16K 5/0626 |

FOREIGN PATENT DOCUMENTS

| | | |
|---|---|---|
| JP | S6429574 U | 2/1989 |
| WO | 2021226671 A1 | 11/2021 |

\* cited by examiner

PLUMBING DEVICE

PRIORITY CLAIM

This patent application is a U.S. National Phase of International Patent Application No. PCT/EP2021/080611, filed Nov. 4, 2021, which claims priority to Australian Patent Application No. 2020904030, filed Nov. 5, 2020, the disclosures of which are incorporated herein by reference in their entireties.

TECHNICAL FIELD

The present disclosure relates to a plumbing device or fluid control device. In particular, the present disclosure relates to a plumbing device incorporating water control mechanisms. The present disclosure also relates to a method associated with the plumbing device.

BACKGROUND

Some appliances require water control mechanisms to be connected to them in order to ensure suitable operation. For example, a potable water supply requires a backflow prevention device to be connected to it during use. If multiple control mechanisms are required, solutions become increasingly complex and awkward to install. This complexity increases cost, material usage and labour requirements.

Furthermore, depending on the circumstances, certain control mechanisms may be omitted if, for example, there is not suitable space to install them. Plumbers may try various solutions to find a suitable arrangement, wasting further time, and frequently sub-optimal solutions are implemented. The control mechanisms may also be different brands, with different specifications and methods of connection, meaning the system as a whole may not work in unison or additional fittings may be required to obtain a successful installation.

Bearing this in mind, the present inventor(s) have developed an improved plumbing/flow control device.

SUMMARY

The present fluid control device has a housing with an inlet and an outlet with a flow passage therebetween, the fluid control device comprising: a first connector at the inlet and a second connector at the outlet; the housing comprising: a first body formed as a single piece, the first body including the inlet at an upstream end thereof and housing a pressure regulator to regulate flow in the flow passage and having a downstream end, a second body formed as a single piece, the second body having an upstream end, housing a check valve to prevent back flow through the flow passage, and including the outlet; the downstream end of the first body being connected and sealed to the upstream end of the sealed body forming a cavity therebetween, the cavity having a lateral opening; a stop valve within the cavity to selectively block flow through the flow passage, wherein a handle mechanism for the stop valve extends through the lateral opening.

The pressure regulator, check valve and stop valve are all accommodated within a housing having a single sealed joint thereby significantly reducing any potential for leak paths as well as significantly reducing the length of the device.

Optionally, the stop valve incorporates a flood prevention regulator. This provides further functionality in the device without adding further joints.

Optionally the stop valve has a pressure release aperture in fluid communication with the device outlet when the stop valve is closed causing, in use, a pressure reduction across the flood prevention regulator allowing the flood prevention regulator to be automatically reset by closing the stop valve. This provides an easy reset for the flood prevention regulator which normally has to be disconnected in order to be reset.

Optionally the stop valve is insertable via the downstream end of the first body or the upstream end of the second body. This facilitates an easy assembly within the constraints of the device.

The stop valve may be any suitable valve. Optionally the stop valve is a ball valve.

The ball valve may have a handle which is connected to the valve element in situ as is conventional. Optionally the ball valve comprises a handle integral with the ball valve and insertable into the lateral opening via the downstream end of the first body or the upstream end of the second body. This reduces the component count and allows for quicker assembly.

Optionally first and second ring seals are housed within the cavity to seal with the upstream and downstream ends respectively of the stop valve.

Optionally the regulator is insertable into the first body at the inlet end. Optionally the first body has a shoulder to provide a stop for the regulator. Optionally the check valve is insertable into the second body from the upstream end. Optionally the second body has a shoulder to provide a stop for the check valve. This provides an easy way to assemble the device within the constraints of the device. It also ensures that the regulator and check valves are reliably and securely supported.

The length of the device 100 may, for example, be less than 200 mm. In additional or alternative examples, the length of the device may be more than 75 mm. In some examples, the length of the device ranges between approximately 140 mm and approximately 150 mm, such as approximately 144 mm, approximately 145 mm, and other integer numbers and non-integer numbers therebetween.

In another aspect the fluid control device may be assembled by a method comprising: inserting the pressure regulator into the upstream end of the first body; inserting the check valve into the upstream end of the second body; inserting the stop valve into the downstream end of the first body or the upstream end of the second body such that the handle mechanism for the stop valve extends through the lateral opening: connecting and sealing the downstream end of the first body to the upstream end of the second body forming the cavity therebetween.

The method optionally comprises inserting the first and second ring seals into the cavity prior to connecting the first and second bodies, wherein the step of connecting and sealing the downstream end of the first body to the upstream end of the second body causes the first and second ring seals to seal with the stop valve.

The method optionally comprises inserting an O ring between the downstream end of the first body and the upstream end of the second body to provide the sealing.

The method optionally comprises the step of connecting the downstream end of the first body to the upstream end of the second body being done by ultrasonic welding.

In another aspect, a plumbing device includes a body with an inlet and an outlet; a pressure regulating device; a backflow prevention device and a flood prevention device; wherein a first portion of the body is connected to a second portion of the body to substantially house the pressure regulating device, the backflow prevention device and the flood prevention device.

In another aspect, a method of assembling a plumbing device includes the steps of: retrieving a housing having an inlet, an outlet and a flow axis extending between the inlet and the outlet; housing a flood prevention device in the housing; and housing a fluid control mechanism in part of the housing, the fluid control mechanism performing a different fluid control function compared to the flood prevention device; wherein a first portion and a second portion of the housing are configured to be connected together to house the fluid control mechanism and the flood prevention device at different locations along the flow axis.

BRIEF DESCRIPTION OF THE DRAWINGS

By way of example only, preferred embodiments of the present disclosure will be described more fully hereinafter with reference to the accompanying figures, wherein.

DETAILED DESCRIPTION

Figure 1:
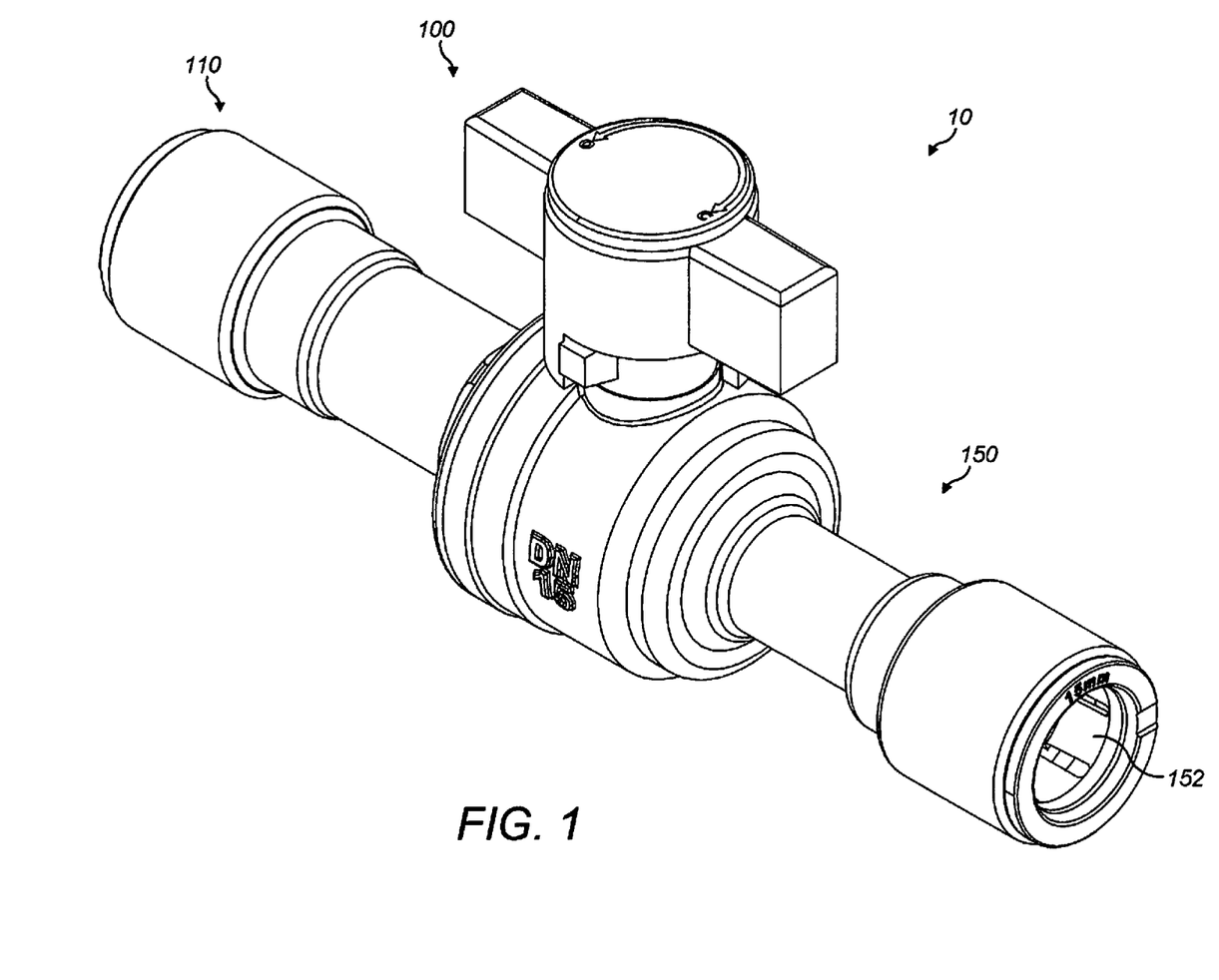
FIG. 1 is a perspective view of a plumbing device of a first embodiment.
Figure 2:
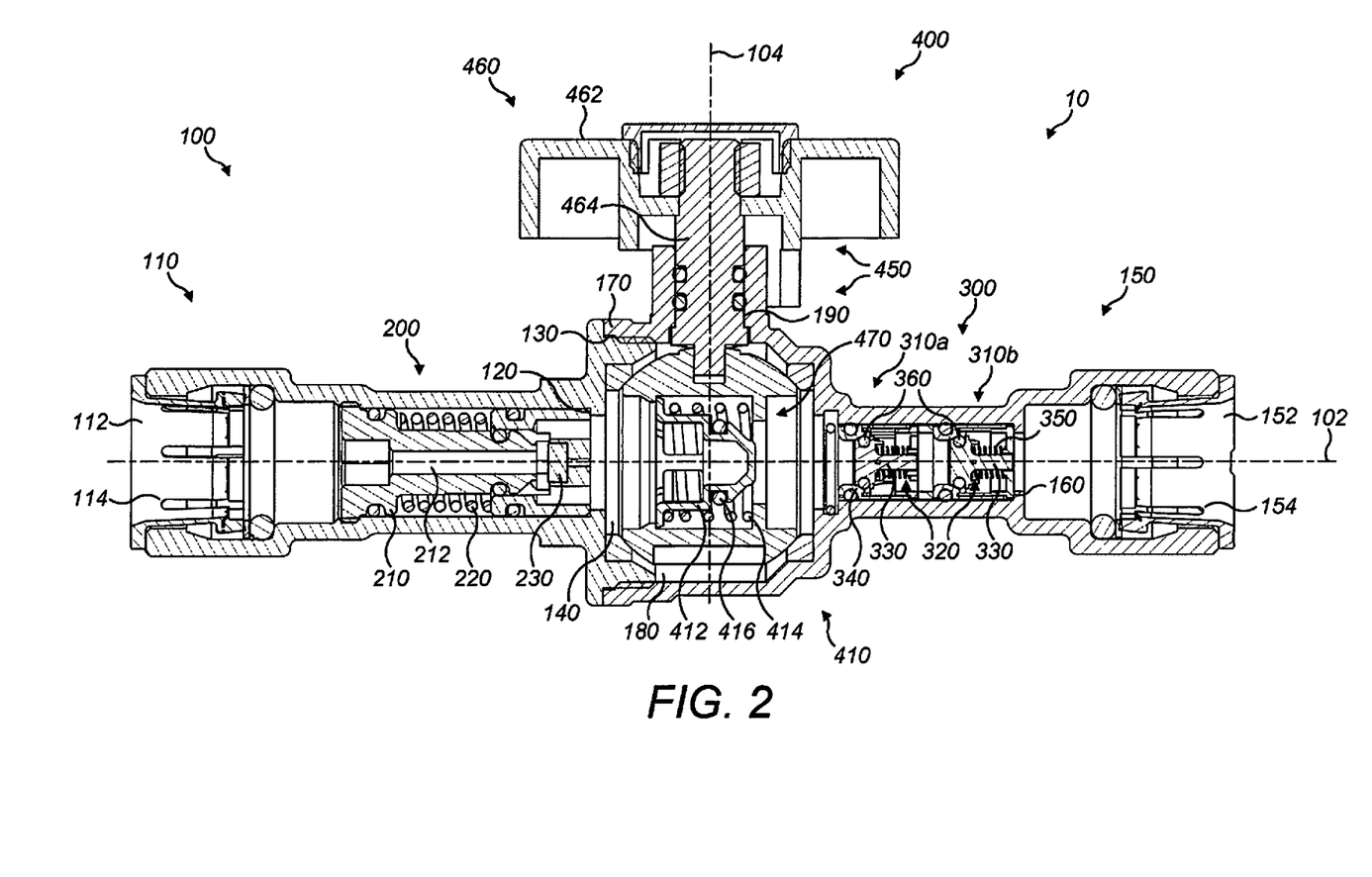
FIG. 2 is a sectional view of the plumbing device of FIG. 1.

FIGS. 1 and 2 illustrate a plumbing device 10 according to a first embodiment of the present disclosure. The plumbing device 10 includes a body 100 in the form of a housing, a first fluid control mechanism 200 in the form of a pressure regulating device, a second fluid control mechanism 300 in the form of a backflow prevention device, and a third fluid control mechanism 400 comprising a flood prevention device.

The body 100 includes a flow axis 102. The flow axis 102 extends from one side of the body 100 to another. Fluid flows substantially in a direction along the flow axis 102. The body 100 also includes a transverse axis 104. The transverse axis 104 extends transversely to the flow axis 102. The transverse axis 104 extends vertically across a central portion of the body 100. The length of the body 100, from the inlet aperture or orifice 112 to the outlet aperture 152, is approximately 145 mm. The length of the body 100 may, for example, be less than 200 mm. In additional or alternative examples, the length of the body may be more than 75 mm. In some examples, the length of the body 100 ranges between approximately 140 mm and 150 mm, such as 144 mm, 145 mm, and other integer numbers and non-integer numbers therebetween.

The body 100 comprises a first portion 110 and a second portion 150. The first portion 110 includes an inlet aperture or orifice 112 that is configured to receive fluid. The inlet aperture 112 is substantially circular. The inlet aperture 112 includes an inlet connector 114. The inlet connector 114 is in the form of a push-to-connect fitting. The inlet connector 114 includes a sealing part or portion to seal with a pipe. The sealing part includes an O-ring in this embodiment. In further embodiments, it would be appreciated that the inlet connector 114 may include other push fittings, threaded connections and so forth.

The first portion 110 includes a control mechanism retainer 120 in the form of a shoulder. The retainer 120 assists in retaining the first fluid control mechanism 200. That is, as the mechanism 200 is moved along an internal portion of the first portion 110, in a direction along the axis 102, the mechanism 200 engages with the retainer 120. This can prevent the mechanism 200 from further moving along the first portion 110 in order to assist in retaining the mechanism 200 therein. It will be appreciated that the first control mechanism 200 is inserted into the first portion 110 from the inlet aperture 112 towards the further aperture or orifice 140.

The first portion 110 also includes a connecting portion 130 that is configured to connect to the second portion 150. The connecting portion 130 includes a shoulder that overlaps part of the second portion 150 to connect thereto. In the first embodiment, the connecting portion 130 slides under the second portion 150 and then both are ultrasonically welded together. In additional or alternative embodiments, the first portion 110 may be connected together by a screw thread or other threaded portions and then ultrasonically welded or bonded using an appropriate medium. The connecting portion 130 is formed with the assistance of further aperture 140. The further aperture 140 is configured to pass fluid therethrough during use of the plumbing device 10.

Figure 3:
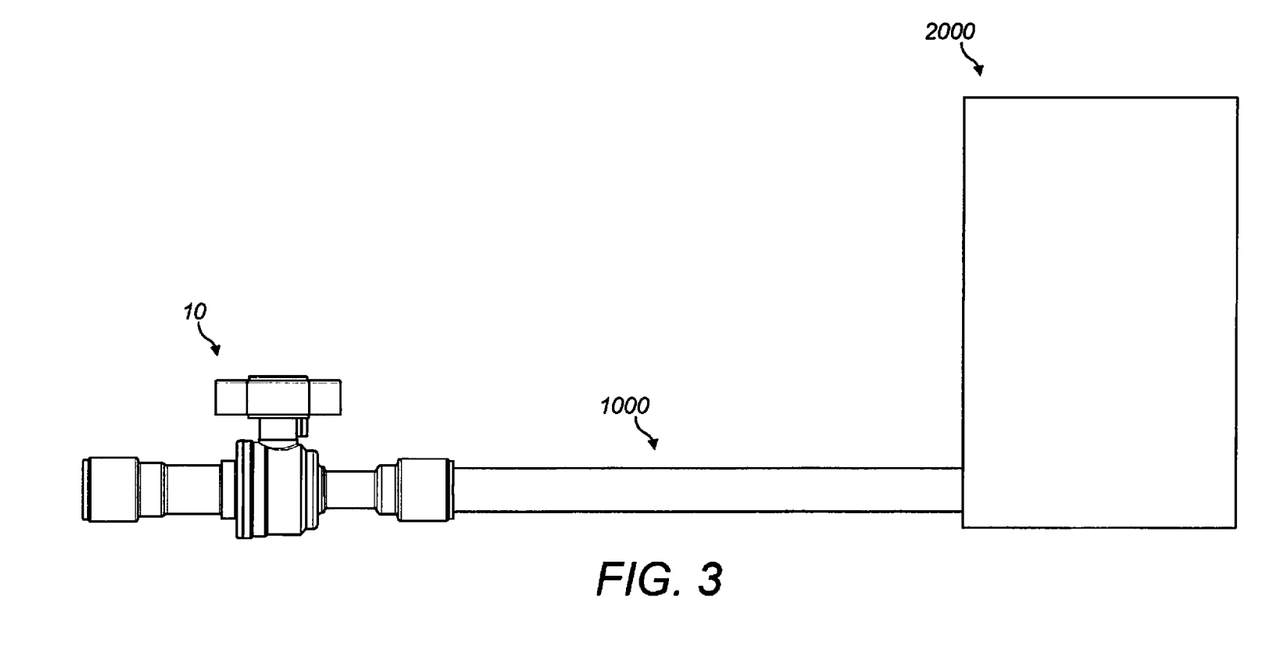
FIG. 3 is a side view of the plumbing device, FIG. 1, connected to a device.
Figure 4:
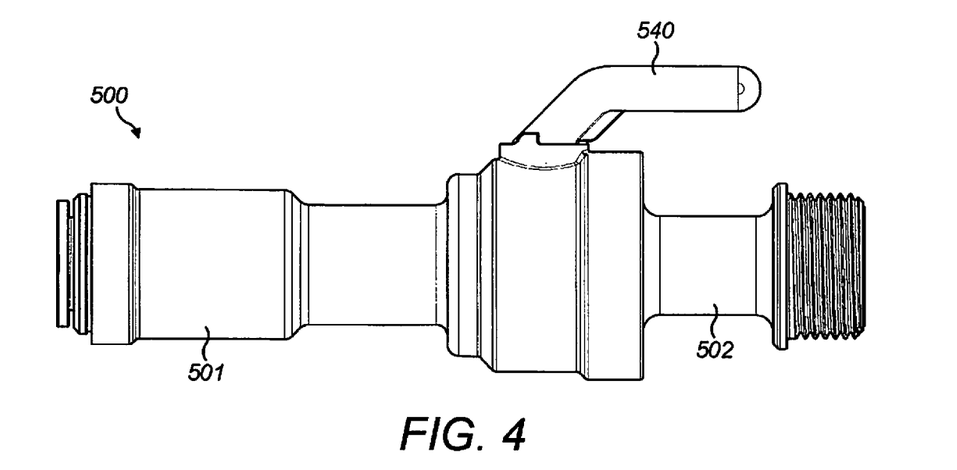
FIG. 4 is a side view of the fluid control device of a second embodiment.
Figure 5:
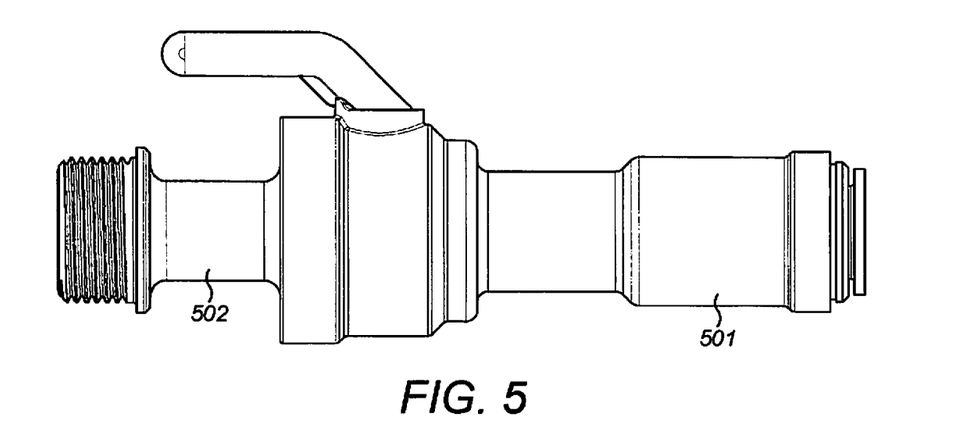
FIG. 5 is a view similar to FIG. 4 from the opposite side.
Figure 6:
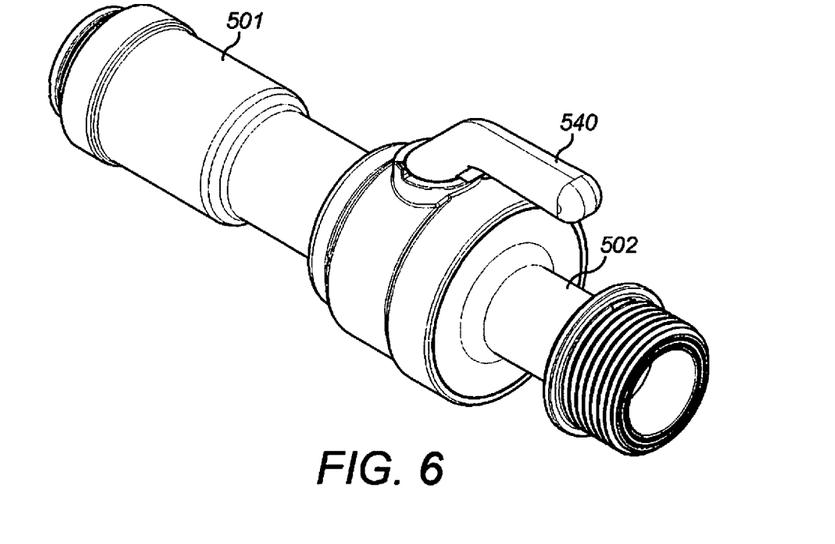
FIG. 6 is a perspective view of the device of FIG. 4 from the same side as FIG. 4.
Figure 7:
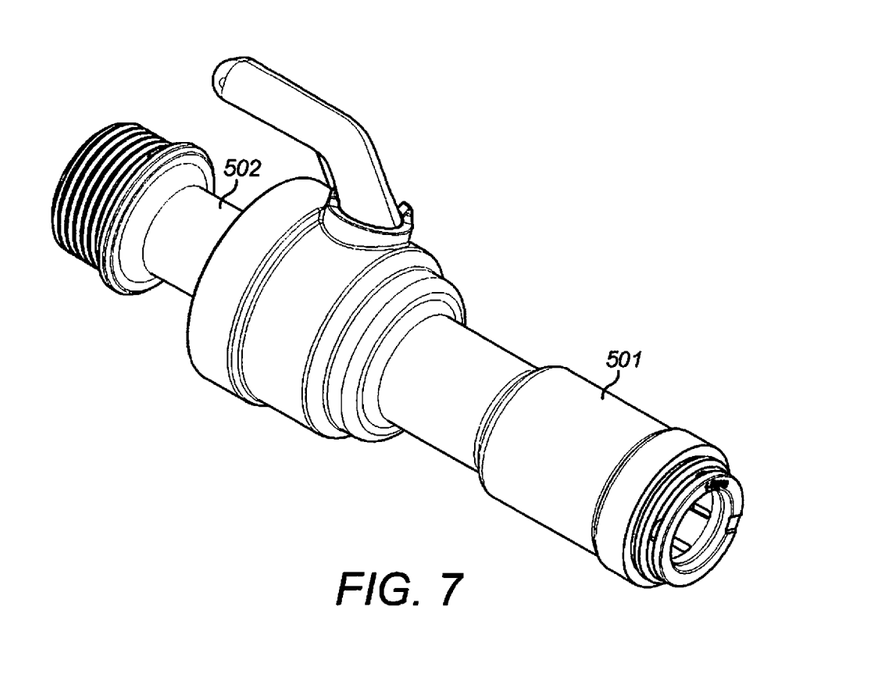
FIG. 7 is a perspective view of the same device from the side of FIG. 5.

The second portion 150 includes an outlet aperture or orifice 152. The outlet aperture 152 is substantially aligned with the inlet aperture 112. In this regard, the flow axis 102 passes through both the inlet aperture 112 and the outlet aperture 152. To this end, the flow axis 102 is defined by the path of fluid through the body 100. In further embodiments, the inlet aperture 112 and the outlet aperture 152 may be, for example, offset at transverse angles. In these further embodiments, the flow axis 102 may extend at a 90 degree angle. The outlet aperture 152 includes an outlet connector 154. The outlet connector 154 is a push-to-connect fitting but, as will be appreciated, other connections may be used. The outlet connector 154 is configured to connect to pipe 1000. As shown in FIG. 3, pipe 1000 is connected to a device 2000 in the form of a water cooler. The device 2000 requires fluid control upstream thereof to ensure correct operation of the device 200.

The second portion 150 further includes a control mechanism retainer 160. The retainer 160 forms a shoulder. The retainer 160 is located between the outlet aperture 152 and the further aperture or orifice 180, as outlined in further detail below. The retainer 160 is configured to act as a stop to prevent the second fluid control mechanism 300 from being inserted further into the second portion 150. That is, the second fluid control mechanism 300 is inserted into the second portion 150, from the further aperture 180, and stops when it engages with the retainer 160. This assists in retaining the mechanism 300 in a suitable location of the second portion 150.

The second portion includes a connecting portion 170 in the form of a shoulder. The connecting portion 170 is slightly larger than the connecting portion 130. The connecting portion 170 is configured to slide over the connecting portion 130. The connecting portion 170 abuts a stop on the first portion 110. Following this, the first portion 110 and the second portion 150 may be ultrasonically welded together. As indicated above, the first portion 110 and the second portion 150 may alternatively be fastened together with a threaded connection (and then welded together). In this regard, it would be appreciated that the first portion 110 and the second portion 150 complement each other to form a single structure to hold the mechanisms 200, 300, 400 when connected. That is, first portion 110 and second portion 150 are fluidly sealed together to form a suitable housing to hold the mechanisms 200, 300, 400.

The further aperture 180 is configured to receive at least part of the third fluid control mechanism 400. This is indicated in FIG. 2. The further aperture 180 is substantially circular and coincides with the flow axis 102. The further aperture 180 is also adjacent to transverse or lateral aperture or orifice 190. The transverse aperture 190 extends in a direction that is substantially parallel with axis 104. In this regard, the transverse aperture 190 is substantially perpendicular to the further aperture 180. To this end, when the first portion 110 is connected to the second portion 150, the body 100 substantially forms a T-shape. That is, part of the body 100 is formed along flow axis 102 whilst another part of the body extends along transverse axis 104. As outlined further below, this assists with holding multiple fluid control mechanisms 200, 300, 400 in the one body 100. In this regard, the body 100 provides a suitable housing where various modular mechanisms may be housed therein. This considerably reduces the length of the plumbing device 10, in a non-obvious manner, compared to (for example) housing mechanisms in separate housings and providing connections therebetween. In further embodiments, the body 100 have multiple inlets/outlets and form a cross (+) shape.

The first fluid control mechanism 200 assists in limiting fluid pressure from an upstream source. The first fluid control mechanism 200 includes a regulating member 210. The regulating member 210 is elongate and has an opening 212 to allow fluid to pass therethrough. The opening 212 has a decreased flow area relative to the upstream flow passages, resulting in a decrease in static pressure. The second regulating member, the piston 230, is biased by a spring 220 away from the first regulating member 210. In response to fluid pressure increasing in the plumbing device 10, the piston 230 is forced towards the regulating member 210. The distance between the end of the regulating member 210 (or opening 212) and the regulating piston 230 adjusts the fluid pressure downstream. To further elaborate, fluid pressing on the outer surface of the regulating piston 230 moves the regulating piston 230 along first portion 110, compressing the spring 220. This narrows the distance between the regulating member 210 and the regulating piston 230, increasing the pressure drop. This results in reducing the pressure of the fluid downstream (as the fluid passes the regulating piston 230 around outer portions adjacent thereto).

The second fluid control mechanism 300 forms a backflow prevention device. The second fluid control mechanism 300 includes a first check valve 310a and a second check valve 310b. In this regard, the use of a reference numeral followed by a lower case letter typically indicates additional or alternative embodiments of a general element identified by the reference numeral in this specification. Thus, for example, check valve 310a is similar, but not identical, to check valve 310b. Further, references to an element identified only by the numeral refer to all embodiments of that element. Thus, for example a reference to check valve 310 is intended to include both the check valve 310a and the check valve 310b.

The check valves 310 may separately constitute fluid control mechanisms. On this basis, it will be appreciated that in some embodiments the fluid control mechanisms may perform the same fluid control function. The check valves 310 each include a backflow body 320. The backflow bodies 320 include a stem portion 330. The backflow bodies 320 interact with an outer portion 340. The stem portion 330 is biased by a spring 350 towards a closed position. The stem portion 330 includes a sealing surface 360 that is configured to seal against part of the outer portion 340 in order to prevent fluid flow thereby. During use, fluid flow can urge stem portion 330 forward towards the outlet aperture 152. The spring 350 compresses and fluid passes the end portions towards the device 2000. In the event that fluid is prevented from travelling through the plumbing device 10 towards the device 2000, and fluid begins to seep back through the outlet aperture 152, the stem portion 330 of the backflow bodies 330 is urged away from the outlet aperture 152. This results in the sealing surfaces 360 engaging with part of the outer portion 340 in order to prevent backflow of fluid through the plumbing device 10. To this end, having two check valves 310 assists in having one valve reducing the pressure differential across the other, allowing a more reliable seal and avoiding even minor leakage.

The third fluid control mechanism 400 includes a flood prevention device 410 and an adjusting assembly 450. As will be appreciated from further below, the flood prevention device 410 and the adjusting assembly 450 may be considered separate fluid control mechanisms and, as such, may constitute a third and fourth fluid control mechanism.

The flood prevention device 410 is configured to automatically shut in the event that a substantial leak occurs downstream (e.g., pipe 1000 bursting etc.). The flood prevention 410 is configured to work in combination with the control mechanism 200 (i.e., the pressure limiting device). That is, the control mechanism 200 allows a sufficient amount of water to flow therethrough in order to trigger the flood prevention device 410 if a substantial leak occurs downstream. Combining the flood prevention device 410 with the control mechanism 200 in one body 100 assists in achieving a suitable flow balance between the mechanisms and avoids incompatibility issues. The flood prevention device 410 includes a regulating portion. The regulating portion is in the form of a piston 412. The piston 412 is biased towards a stop of the regulating part 470 with spring 414. The spring 414 encircles an outer portion of the piston 412. The piston 412 includes a sealing surface 416. The sealing surface 416 is configured to seal against part of the regulating part 470 in response to a predetermined flow passing the piston 412. The predetermined flow corresponds to, for example, a burst pipe downstream.

The adjusting assembly 450 includes an actuating portion 460 and the regulating part 470. The actuating portion 460 is configured to move the regulating part 470. The actuating portion 460 comprises a handle 462. The handle 462 is configured to be rotated by a user. The handle 462 is connected to a connecting portion 464. The connecting portion 464 extends through the transverse aperture 190. The connecting portion 464 connects to the regulating part 470. The regulating part 470 is in the form of a ball. The regulating part 470 is configured to retain the flood prevention device 410.

To allow fluid to flow through the plumbing device 10, under normal conditions, the handle 462 is rotated to a flow position as shown in FIG. 2. This positions the regulating part 470 in a location where an aperture or orifice therethrough is substantially aligned with the flow axis 102. As fluid/water flows through the plumbing device 10, it passes the flood prevention device 410 located in the regulating part 470.

In the event that the flood prevention device 410 is triggered due to a problem downstream, the flood prevention device 410 is configured to prevent fluid from passing through the aperture or orifice of the regulating part 470 by moving to a closed position. In order to reset the flood prevention device 410 from the closed position, where the sealing interface 416 is engaged with the regulating part 470, the handle 462 is rotated to an off position. In the off position, a wall of the regulating part 470 prevents further fluid passing through, for example, the further aperture 140. In this position, pressure is relieved from the flood prevention device 410. This allows the spring 414 to urge the piston 412 back into an open position (as shown in FIG. 2). An aperture or orifice through a wall of the regulating part 470 assists in draining fluid from the internal portion of the regulating part 470 in order relieve pressure from the flood prevention device 410. Upon the piston 412 returning to the open position, the handle 462 can be rotated back to the flow position, shown in FIG. 2, in order to allow fluid to flow through the plumbing device 10. In this regard, it will be appreciated that the adjusting assembly 450 may form a separate fluid control mechanism in the plumbing device 10. That is, in this embodiment, the adjusting assembly 450 acts as a ball valve.

With the above in mind, depending on the fluid specifications required for the device 2000, other types of fluid control mechanisms may be used. For example, an anti-scald device may replace the control mechanism 200 in the event that pressure limiting is not required for the device 2000. In a further example, the body 100 may also incorporate a filter/strainer. The filter/strainer may be located upstream from, for instance, the flood prevention device 410. To this end, it would be appreciated that the plumbing device 10 may be provided in a kit for assembly with different options therein. For example, the kit may include at least two or more fluid control mechanisms together with the body 100.

The plumbing device 10 provides a singular valve body 100 that is able to retain multiple fluid control mechanisms. This reduces material usage, assembly complexity and installation times in a non-obvious manner. In further detail, the use of the body 100 considerably reduces the size of the plumbing device 10 and avoids having to combine different mechanisms together in an awkward manner. This reduction in size, along with complexity, also results in a lower cost product that better serves customers. For example, the plumbing product 10 is approximately 145 mm which can be readily installed in a variety of situations.

The second embodiment will now be described with reference to FIGS. 4 to 11.

The previously described embodiment is particularly suited for a metal casing, whereas the present embodiment is particularly suited for a plastic casing. In particular, the plastic casing is formed by moulding various components. As such, this places limits on the manner in which the components can be formed, some modifications to the present design have therefore been made to accommodate this.

Broadly, the housing 500 comprises a first tubular body 501 and a second tubular body 502 which are joined together to form the fluid control device and contain a number of components as described below.

The device has an inlet 503 at one end and an outlet 504 at the opposite end such that the flow flows from the inlet 503 to the outlet 504 from left to right in FIGS. 4, 6, and 8 to 11.

The inlet end of the first tubular body 501 is provided with a quick release connector 505 which has a collet 506 to grip an upstream pipe and an O-ring seal 507 to seal with the pipe. These types of connector are well known in the art and will now be described in greater detail below.

The outlet end is provided with a screw threaded connector 508. However, any suitable end connection as needed can be provided at either end.

Figure 8:
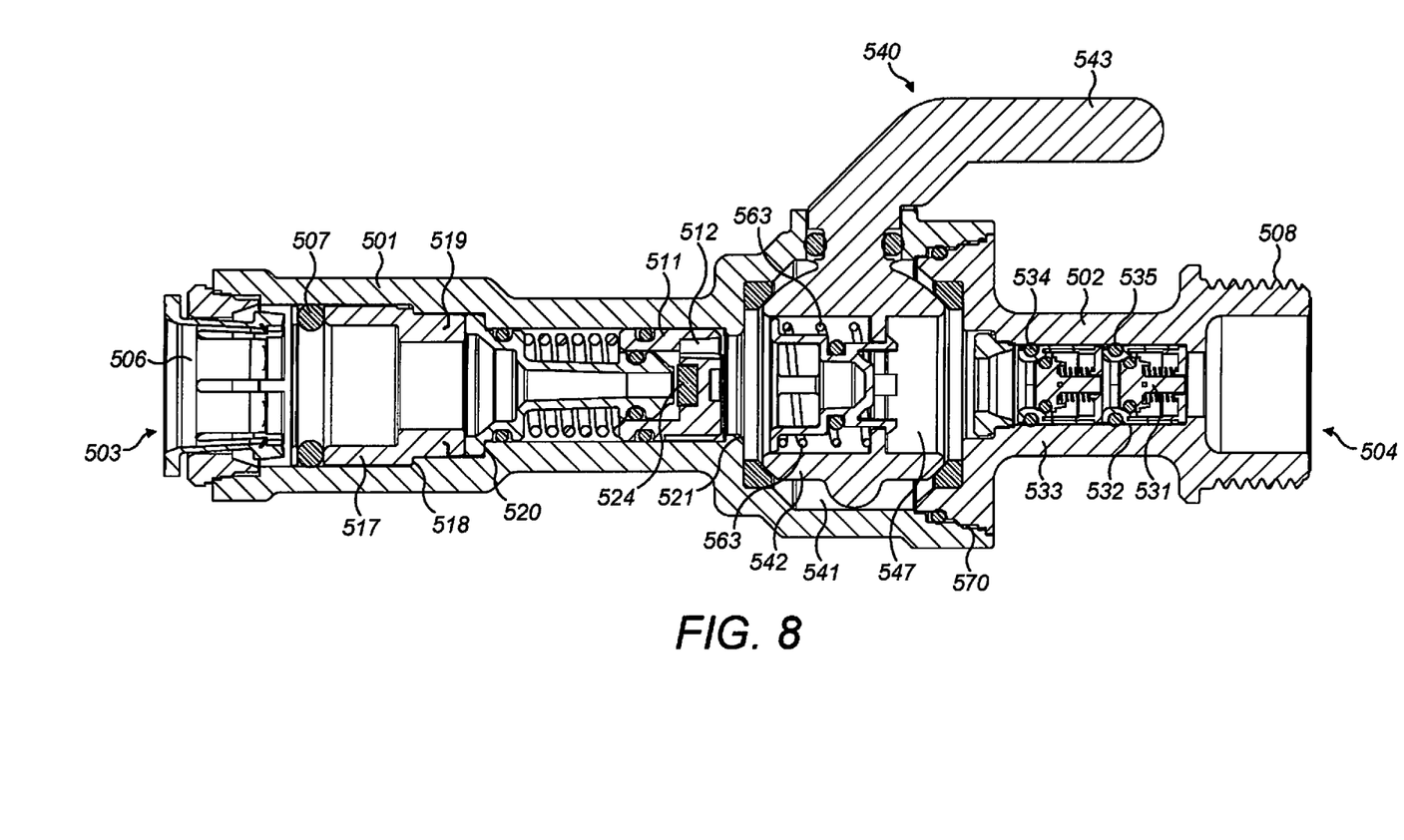
FIG. 8 is a cross-section through the device of FIG. 4 with the stop valve open.
Figure 9:
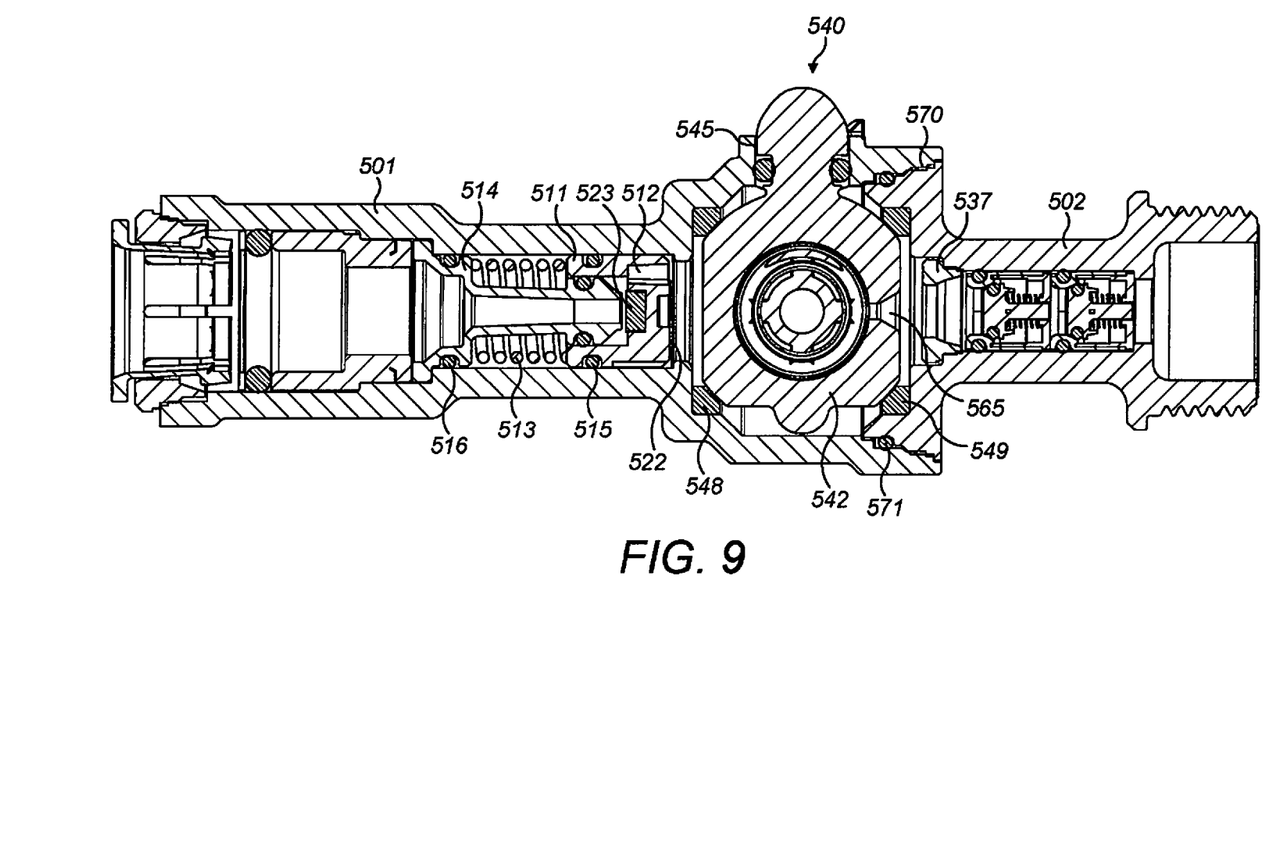
FIG. 9 is a view similar to FIG. 8 with the stop valve closed.

The downstream end of the first tubular body 501 houses a regulator 510. This comprises a regulating piston 511 with a plurality of flow passages 512, only one of which is shown in FIGS. 8 and 9. The piston bears against a regulator body 514 which has a hollow internal flow passage. Both the piston 511 and regulator body 514 are sealed to the first tubular body 501 by respective O-rings 515, 516.

If the tubular body 501 is formed as a plastic moulding, it may not be practical to mould an undercut to the inner bore of the body. Instead, the regulator 510 can be retained in place by a hollow sleeve 517 which is retained on a shoulder 518 within the first tubular body 501 and is held in place by gripping teeth 519. As shown in FIGS. 8 and 9, the sleeve 517 holds the upstream end of the regulator in place against a shoulder 520 which prevents further downstream movement of the regulator. A shoulder 521 provides an end stop for the piston 511.

In use, the piston 511 is biased in a downstream direction by the spring 513 and the fluid pressure. In response to an increase in the pressure through the regulator, because the downstream surface area 522 is greater than the upstream area 523, the pressure increase will push the biased piston 511 to the left in an upstream direction thereby reducing the gap 523 between the end of the regulator body 514 and the piston 511 thereby causing pressure reduction. A pressure reduction through the device will cause the net pressure differential across the piston to be reduced such that the biasing force piston 513 causes the gap 524 to be increased thereby increasing the pressure. In practice this causes the pressure to remain at the regulated level.

Figure 10:
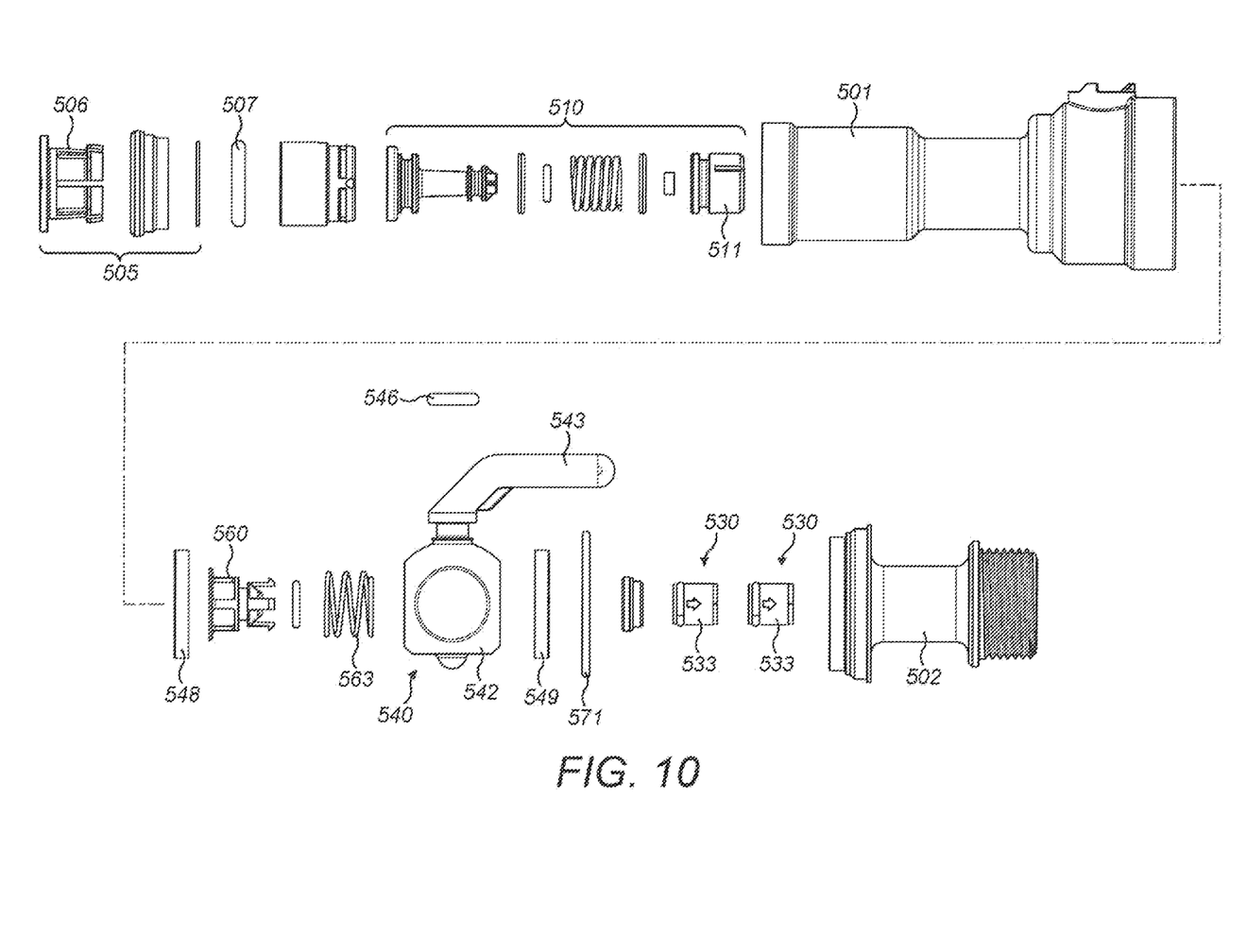
FIG. 10 is an exploded version of FIG. 4.
Figure 11:
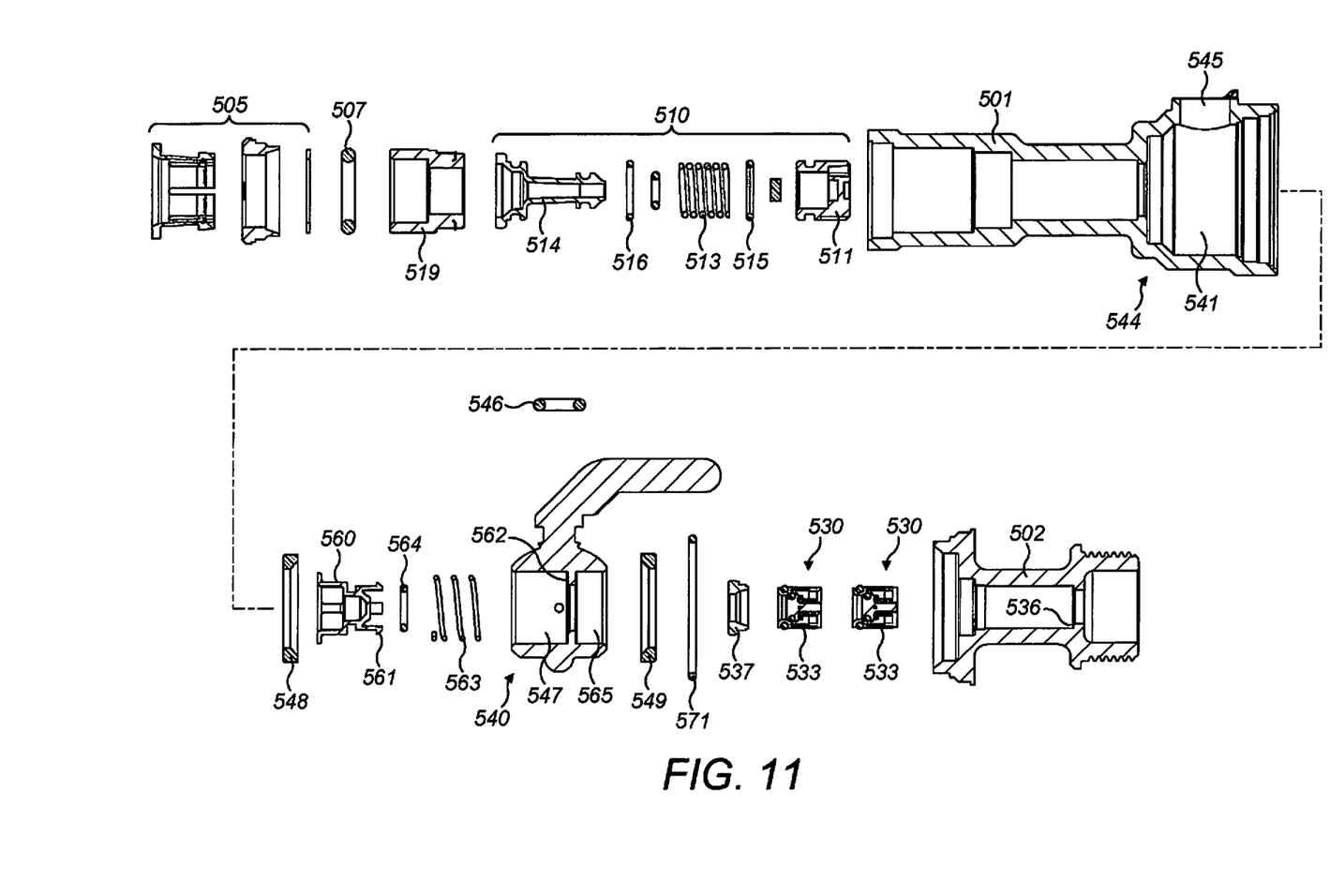
FIG. 11 is an exploded version of FIG. 9.

As will be apparent from FIGS. 10 and 11 all of the components as described can be inserted on the inlet end 503 generally in the sequence in which they are shown in FIGS. 10 and 11, although the various O-rings are fitted to their respective components prior to insertion.

Within the second tubular body 502 are a pair of check valves 530. Each of these has a spring loaded plunger 531 which seats against the seat 532 which is formed on a check valve cartridge 533 with the sealing interface being sealed by an O-ring 534. The cartridges 533 are sealed to the wall of the second tubular body 502 by an O-ring 535. The two check valves 530 are held in place as they are retained between a shoulder 536 on the second tubular body 502 and a retaining ring 537 which is fixed in an upstream end of the second tubular body 502. As shown in FIGS. 10 and 11, these two check valves 530 can simply be inserted into the upstream end of the second tubular body 502 followed by insertion of the retaining ring 537.

Any back flow through the device is prevented by these check valves 530 as the back flow will push the plungers 531 closed.

In FIGS. 8 and 9, the stop valve 540 is retained in a cavity 541 which is formed between the first 501 and second 502 tubular bodies.

The stop valve 540 has a ball valve 542 with an integral handle 543. A valve of this general type is described in EP 3404299.

The first tubular body 501 has an enlarged downstream end 544 creating a cavity 541.

This downstream end 544 is provided with a lateral aperture or orifice 545. In order to insert the stop valve 540 into the first tubular body 501, the stop valve 540 is inverted from the position shown in FIGS. 10 and 11. In this orientation, it is inserted into the cavity 541 such that the handle 543 first enters the first tubular body 501 and subsequently passes through the lateral aperture 545. Further rotation of the stop valve 540 brings the ball valve 542 fully into the cavity and brings the handle 543 into its final position as shown in FIGS. 8 and 9. Further details of this are provided in EP 3404299. In this position, the handle 543 is sealed with respect to the first tubular body 501 by an O-ring 546.

The ball valve has an internal through bore 547 which, in the position shown in FIG. 8, is in line with the flow passage through the housing to permit flow from the inlet 503 to the outlet 504. A pair of sealing rings 548 and 549 seal the ball valve 542 with respect to the first and second tubular bodies 501, 502 and allow it to be rotated about an axis which is perpendicular to the axis of the flow.

In the position shown in FIG. 9, the ball valve 542 has been rotated to a closed position in which the through bore 547 is out of line with the flow passage thereby sealing off flow through the housing.

Within the ball valve 542, is a flood prevention regulator. This takes the form of a piston 560 with barbs 561 at a downstream end which are fitted through and retained by a flange 562 extending into the through bore 547. The piston 560 is biased into the position shown in FIG. 8 by a spring 563. The piston 560 has an open structure such that there a number of flow paths through the piston in normal operation.

In the event of a leak downstream of the device, the incoming flow into the device, which is controlled by the regulator 510 is exceeded by the outflow from the device to the leak path. This gives rise to a pressure differential across the piston 560 which urges the piston downstream against the action of the spring 563. This causes an O-ring 564 on the piston to seal against the flange 562 thereby cutting off flow through the through ball valve 542.

Once the downstream fault has been repaired, the flood prevention regulator can be reset by rotating the stop valve 540 to the closed position shown in FIG. 9. The ball valve is provided with a pressure relief aperture or orifice 565 (FIGS. 9 and 11). In this position, the upstream side of the piston 560 is cut off from the upstream pressure as the stop valve 540 is in the closed position. The residual fluid on the upstream side of the flange 562 can then drain away through the pressure release aperture 565. This equalises the fluid pressure across the valve allowing the spring 563 to reset the piston 560. At that point, the stop valve 540 can be returned to the open position and the device can function as normal.

One example of a valve with an integrated flood prevention regulator is described in previously filed, co-owned PCT/AU2021/050445, which can be used with the various (including the first and second) embodiments of the present disclosure. PCT/AU2021/050445 is incorporated by reference herein as if set forth in its entirety.

Once the regulator 510, check valves 530 and stop valve 540 have being inserted into the first 501 and second 502 tubular bodies as described above, the assembly of the device is completed by joining the tubular bodies 501, 502 together. The upstream end of the second tubular body 502 is inserted into the open downstream end of the first tubular body 501. The joint 570 is ultrasonically welded and an O-ring 571 provides a fluid tight seal for the joint.

As can be seen in FIGS. 8 and 9, the first 501 and second 502 tubular bodies are dimensioned such that, when joined together, they support the sealing rings 548 549 in the cavity 541 in order to provide the seal for the ball valve 542.

The three valve sections are therefore all accommodated with a single housing joint thereby significantly reducing any potential for leak paths as well as significantly reducing the length of the device.

From the forgoing detailed description, it will be evident that modifications and variations can be made without departing from the spirit and scope of the disclosure. For example, the described exemplary embodiments are not mutually exclusive combinations of features; rather, combinations of different individual features selected from different individual embodiments can be made, without departing from the spirit and scope of the disclosure, as will be understood by those of ordinary skill in the art.

The invention claimed is:

1. A fluid control device having a housing with an inlet and an outlet with a flow passage therebetween, the fluid control device comprising:
   a first connector at the inlet; and
   a second connector at the outlet;
   the housing comprising:
      a first body formed as a single piece, the first body including the inlet at an upstream end thereof and housing a pressure regulator having a downstream end, the pressure regulator defining an opening to allow fluid to pass therethrough, the pressure regulator being configured to regulate flow in the flow passage, the first body further housing a piston biased by a spring away from the pressure regulator, wherein, when fluid pressure is increased in the fluid control device, the piston is forced towards the pressure regulator;
      a second body formed as a single piece, the second body having an upstream end, housing a first check valve to prevent back flow through the flow passage, and including the outlet, the downstream end of the first body being connected and sealed to the upstream end of the second body forming a cavity therebetween, the cavity having a lateral opening;
      a stop valve within the cavity to selectively block flow through the flow passage; and
      a handle mechanism for the stop valve that extends through the lateral opening.

2. The fluid control device according to claim 1, wherein the stop valve incorporates a flood prevention regulator.

3. The fluid control device according to claim 2, wherein the stop valve has a pressure release aperture in fluid communication with the device outlet when the stop valve is closed causing, in use, a pressure reduction across the flood prevention regulator allowing the flood prevention regulator to be automatically reset by closing the stop valve.

4. The fluid control device according to claim 1, wherein the stop valve is insertable via the downstream end of the first body or the upstream end of the second body.

5. The fluid control device according to claim 1, wherein the stop valve is a ball valve.

6. The fluid control device according to claim 5, wherein the ball valve comprises a handle integral with the ball valve and insertable into the lateral opening via the downstream end of the first body or the upstream end of the second body.

7. The fluid control device according to claim 1, wherein first and second ring seals are housed within the cavity to seal with the upstream and downstream ends respectively of the stop valve.

8. The fluid control device according to claim 1, wherein the pressure regulator is insertable into the first body at the inlet end.

9. The fluid control device according to claim 8, wherein the first body has a shoulder to provide a stop for the pressure regulator.

10. The fluid control device according to claim 1, further comprising a second check valve, wherein the first and second check valves are insertable into the second body from the upstream end.

11. The fluid control device according to claim 10, wherein the second body has a shoulder to provide a stop for the first check valve.

12. A method of assembling a fluid control device having a housing with an inlet and an outlet with a flow passage therebetween, the housing including a first body and a second body, the method comprising:
inserting a fluid control mechanism into an upstream end of the first body, the fluid control mechanism including a pressure regulator and a piston biased by a spring away from the pressure regulator, the pressure regulator having a downstream end of the first body and defining an opening to allow fluid to pass therethrough, wherein, when fluid pressure is increased in the fluid control device, the piston is forced towards the pressure regulator;
connecting and sealing the downstream end of the first body to an upstream end of the second body forming a cavity therebetween, the cavity having a lateral opening,
inserting a check valve into the upstream end of the second body; and
inserting a stop valve into the downstream end of the first body or the upstream end of the second body such that a handle mechanism for the stop valve extends through the lateral opening.

13. The method according to claim 12, further comprising:
inserting first and second ring seals into the cavity prior to connecting the first and second bodies, wherein the step of connecting and sealing the downstream end of the first body to the upstream end of the second body causes the first and second ring seals to seal with the stop valve.

14. The method according to claim 12, further comprising:
inserting an O ring between the downstream end of the first body and the upstream end of the second body to provide the sealing.

15. The method according to claim 12, wherein the step of connecting the downstream end of the first body to the upstream end of the second body is done by ultrasonic welding.

16. A plumbing device comprising:
a body with an inlet and an outlet, the body having a first portion and a second portion;
a pressure regulating device defining an opening to allow fluid to pass therethrough;
a piston biased by a spring away from the pressure regulating device, wherein, when fluid pressure is increased in the plumbing device, the piston is forced towards the pressure regulating device;
a backflow prevention device; and
a flood prevention device;
wherein the first portion of the body is connected to the second portion of the body, the first portion of the body housing the pressure regulating device, and the piston, the second portion of the body housing the backflow prevention device and the flood prevention device being housed by the body between the first and second portions.

17. The plumbing device according to claim 16, wherein the inlet of the body is provided with a quick release connector.

18. The plumbing device according to claim 17, wherein the quick release connector includes a collet to grip an upstream pipe and an O-ring seal to seal with an upstream pipe.

19. A method of assembling a plumbing device, the method including the steps of:
retrieving a housing having an inlet, an outlet and a flow axis extending between the inlet and the outlet;
housing a fluid control mechanism in a first part of the housing, the fluid control mechanism including a pressure regulator and a piston biased by a spring away from the pressure regulator, the pressure regulator defining an opening to allow fluid to pass therethrough, wherein, when fluid pressure is increased in the plumbing device, the piston is forced towards the pressure regulator; and
housing a flood prevention device in a second part of the housing, the fluid control mechanism performing a different fluid control function compared to the flood prevention device;
wherein the first and second parts of the housing are configured to be connected together such that the fluid control mechanism and the flood prevention device are located along the flow axis.

20. The method of claim 19, wherein the first and second parts of the housing are connected together by a single ultrasonically welded joint.

21. A fluid control device having a housing with an inlet and an outlet with a flow passage therebetween, the fluid control device comprising:
a first connector at the inlet; and
a second connector at the outlet;
the housing comprising:
a first body formed as a single piece, the first body including the inlet at an upstream end thereof and housing a pressure regulator to regulate flow in the flow passage and having a downstream end;
a second body formed as a single piece, the second body having an upstream end, housing a check valve to prevent back flow through the flow passage, and including the outlet, the downstream end of the first body being connected and sealed to the upstream end of the second body forming a cavity therebetween, the cavity having a lateral opening;
a stop valve within the cavity to selectively block flow through the flow passage, wherein the stop valve incorporates a flood prevention regulator; and
a handle mechanism for the stop valve that extends through the lateral opening;
wherein the stop valve has a pressure release aperture in fluid communication with the device outlet when the stop valve is closed causing, in use, a pressure reduction across the flood prevention regulator allowing the flood prevention regulator to be automatically reset by closing the stop valve.

* * * * *